United States Patent Office 3,585,099
Patented June 15, 1971

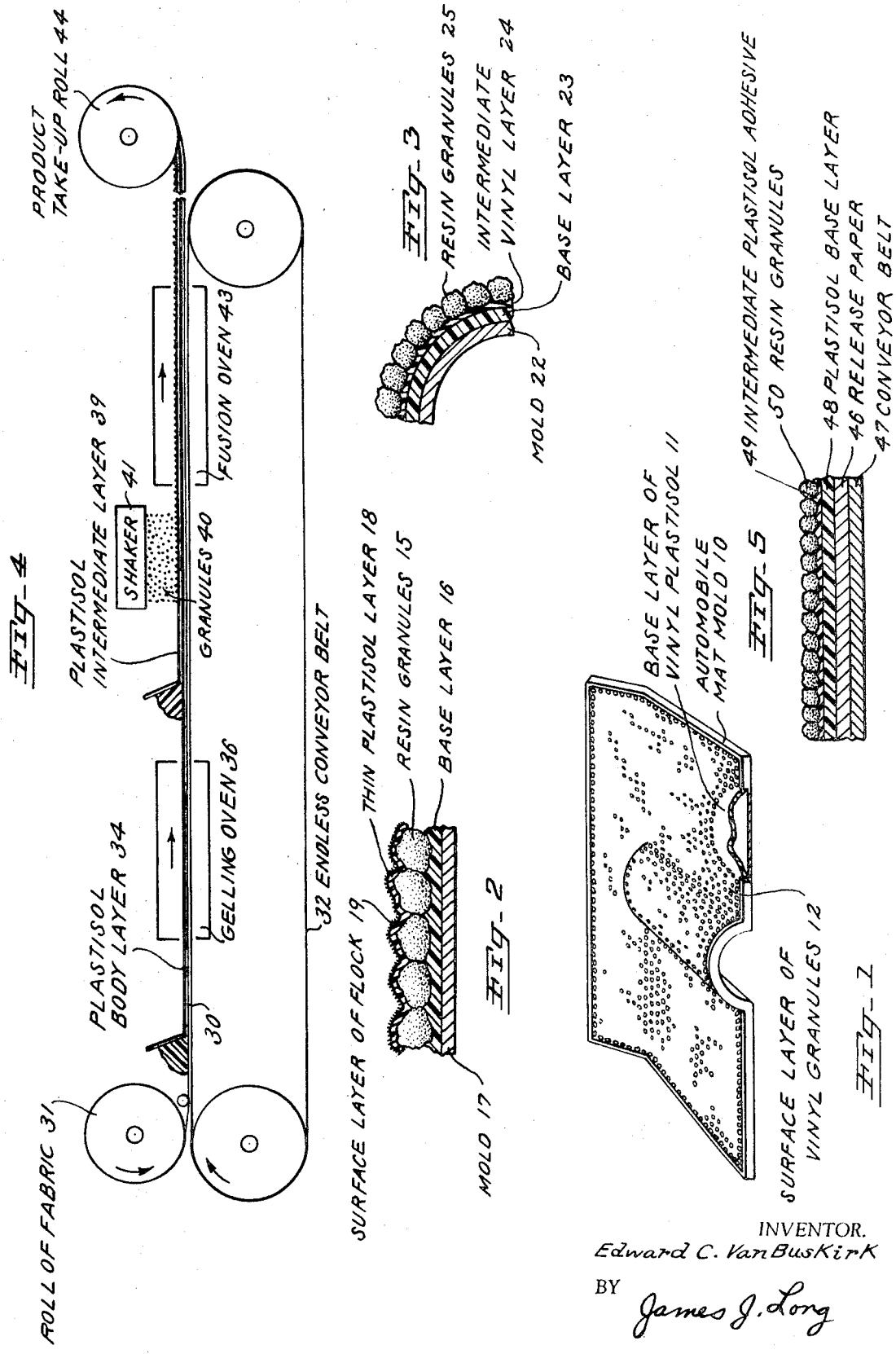

3,585,099
PLASTIC SHEET MATERIAL HAVING TEXTURED SURFACE
Edward C. Van Buskirk, South Bend, Ind., assignor to Uniroyal, Inc., New York, N.Y.
Filed May 18, 1967, Ser. No. 639,355
Int. Cl. B44c 3/00; D03d 27/00; D04h 11/08
U.S. Cl. 161—63
7 Claims

ABSTRACT OF THE DISCLOSURE

Plastic sheet material having a textured, granular, relief surface is made, without necessity for resorting to surface molding or embossing to provide the relief effects, by partially embedding vinyl resin granules in the surface of a vinyl plastisol base layer. Contoured automobile mats, or flat sheet goods with or without a textile or other reinforcing backing, may be made by the method. Flock may be applied to the surface of the granules to give textile-like effects.

BACKGROUND OF THE INVENTION (1) Field of the invention

This invention relates to a plastic sheet material having a textured, carpet-like surface, and to a method of making same.

(2) Description of the prior art

U.S. Pat. 3,192,294, Streed et al., June 29, 1965, discloses making plastic sheet material having a textured surface by a method involving embossing.

U.S. Pat. 3,152,002, Wisotzky et al., Oct. 6, 1964, produces plastic floor covering having molded pile effects.

The present invention is directed to production of textured effects resembling carpeting or the like without any necessity for embossing or molding the surface.

SUMMARY OF THE INVENTION

The invention is directed to the manufacture of plastic sheet material having a textured surface, more particularly a granular relief surface of carpet-like appearance, such as is useful for an automobile mat or trunk lining, for example. The sheet material of the invention is constituted of a base layer cast from a plastisol; particles or granules of resin applied to the surface of the plastisol prior to fusion provide a textured effect. After a layer of resin particles has been established on the plastisol surface the assembly is heated to fusion temperature, whereby the plastisol base layer fuses and the particles or granules become firmly secured to the base layer. The resulting sheet has a grained or textured surface resembling carpeting and makes a highly durable and decorative automobile mat or other floor covering. The textured surface is achieved without any embossing or molding, that is, without confining or applying pressure to the surface.

BRIEF DESCRIPTION OF THE DRAWINGS

The invention will be described with reference to the accompanying drawings, wherein:

FIG. 1 is a diagrammatic perspective view, with portions broken away, of a contoured automobile mat being made in a mold in accordance with the invention;

FIGS. 2 and 3 are fragmentary end views of modified constructions of the invention, on a larger scale;

FIG. 4 is a diagrammatic elevational view representing a continuous practice of the invention, on a smaller scale; and, FIG. 5 is a fragmentary end view of a modified construction, on a larger scale.

DESCRIPTION OF THE PREFERRED EMBODIMENTS

The invention may be practiced as a continuous process for example by casting or spreading the plastisol on a running length of supporting surface (whether a temporary supporting material having a release surface, or a backing material intended to become part of the product, such as a woven or non-woven fabric, paper, or the like), spreading the resin particles on the wet plastisol, and then passing the assembly through a heating device in which fusion takes place. After emerging from the heating device and cooling to a suitable temperature the resulting product (after stripping from the release surface if such a temporary support was used) is wound up in a continuous length or cut into suitable shapes. The invention may also be practiced discontinuously by casting the plastisol in single shapes of definite desired size, for example in the form of a contoured automobile mat.

The resinous material employed in the invention may be any suitable conventional thermoplastic resin, and is preferably a vinyl resin, especially a vinyl chloride resin, as represented by vinyl chloride homopolymer or copolymers of vinyl chloride with such copolymerizable monomers as vinyl acetate and the like. Mixtures of resins (e.g. a mixture of polyvinyl chloride and vinyl chloride-vinyl acetate copolymer) may be used.

To form the base layer the resin is used, as indicated previously, in the form of a plastisol, which is applied to a suitable forming or molding surface, such as a contoured automobile mat mold. The plastisol may be applied to the mold in any suitable conventional manner, such as by brushing, spraying, or dipping. If desired, the plastisol may be of the kind that contains, in addition to the usual resin and plasticizer, a quantity of volatile organic solvent; this kind of plastisol is sometimes referred to as an organosol, and is frequently found particularly suitable for application by spraying. The plastisol may further contain usual compounding ingredients such as pigments, stabilizers, etc. In a preferred practice especially adapted to making contoured articles, as distinguished from flat planar articles, the plastisol contains thickeners or thixotropic agents to facilitate application of uniform layer of plastisol on non-horizontal portions of the contour without undesirable running or sagging of the plastisol.

The resin of the resin particles which are deposited on the plastisol may be the same as or different from the resin of the plastisol. The resin particles may be all of the same color (which may be the same as or different from the color of the base plastisol) or variously colored particles may be used, applied in admixture to give tweed or salt-and-paper effects or applied in patches or patterns or the like to give mottled or variegated effects or designs of various kinds. Transparent or translucent particles and/or plastisol may be used.

The surface of the plastisol base layer is in a wet, ungelled state when the particles are applied so that the lower portions of the resin particles sink into or become embedded in the surface of the plastisol layer. However, the applied resin particles or granules do not sink completely into the plastisol, particularly if a thixotropic plastisol is used, but remain sticking up out of the plastisol layer to provide a desired rough texture, or grain-like or pebbled surface, which is a consequence of the size and shape of the protruding particles. In some cases, particularly when the initially applied plastisol is not thixotropic, the initially applied plastisol layer is gelled at least partially before the resin particles are applied, but in that event an additional thin layer of wet plastisol is applied just prior to deposition of the particles so that a wet surface, to which the resin particle will stick, is provided. Thus, it may be advantageous especially in making contoured articles, to spray the base plastisol onto a preheated molding surface on which the plastisol gels; thereafter, after cooling, a further thin layer of plastisol is applied followed by deposition of the resin particles. The further thin layer need not be thixotropic, and has a thickness less than the size of the particles, so that portions of the particles remain sticking up even though the particles sink in the thin layer.

To prepare the irregular granules or particles relied upon to provide surface texture, the resin as supplied by the manufacturer in the form of a uniform fine powder (or sometimes in the form of molding pellets or chips) is first converted, by fusion, into a coherent bulk or mass which is thereafter fragmented or ground up in a suitable disintegrating or grinding device. Such fusion of the initial resin powder into a coherent mass is conveniently accomplished by working the resin powder (along with any desired compounding ingredients such as plasticizer, stabilizer, pigments, etc.) at elevated temperature (in excess of the fusion temperature) so as to produce a sheet or the like. The thus-produced coherent mass is thereafter fed to a conventional chopping device where it is subjected to impact and attrition to produce pre-fused particles or granules of suitable controlled size range. If desired the resin particles may be made up at least in part of pre-fused scrap or re-used resin.

It is preferred to use resin particles which are relatively soft and flexible or resilient to give a desirable feel or compression aspect to the product. For this purpose it is desirable that the resin particles as employed have a sufficiently high content of plasticizer to provide softness and flexibility. However, it is not ordinarily feasible to fragment, into particles or granules of the desired kind, a resin having a high enough plasticizer content to be soft and flexible, by convenient or economical methods. Soft, highly plasticized vinyl resin would require mixing with relatively large quantities of Dry Ice, and painfully slow grinding—an inefficient procedure. This difficulty is avoided by fragmentation of a pre-fused resin mass that is relatively rigid or hard, containing either substantially no plasticizer or, if the resin is plasticized, the plasticizer content is limited, usually to not more than about 80 parts by weight per 100 parts of resin. Thereafter, once the hard, rigid pre-fused resin has been fragmented into hard particles or granules, the plasticizer content of the particles is increased by mixing the particles with a further quantity of plasticizer which diffuses into the pre-fused resin particles, or is absorbed or imbibed by ("dissolves" in) the resin particles so that they are then rendered soft and flexible. Satisfactory results are obtained by thus increasing the total plasticizer content of the resin particles to a value sufficient to render the particles soft and flexible. For this purpose a final plasticizer content in the resin particles of at least about 110 parts, preferably 140 to 200 parts, per 100 parts by weight of resin is usually sufficient. The additional plasticizer may be diffused into the pre-fused resin particles by blending the particles with the required quantity of additional plasticizer, for example in the kind of tumbling or mixing device usually used for making dry mixes, or the particles may be immersed in an excess of plasticizer, from which the particles are subsequently removed by straining or draining. The additional plasticizer thus contacted with the solid resin particles gradually diffuses into the surfaces of the particles, for example upon standing overnight at room temperature or within a period of a few hours at moderately elevated temperature (e.g. 160° F.). The rate of absorption of plasticizer can be accelerated by preheating the plasticizer. The condition or texture of the particles containing the thus-absorbed or imbibed plasticizer may be likened to damp fine gravel or coarse coffee grounds, that is, there is some ability to flow although the particles are not as readily flowable as dry particles.

Application of the resin particles to the surface of the plastisol base layer may be done by hand or with the aid of conventional mechanical sifting or sprinkling devices. In the ordinary case substantially the entire surface of the plastisol will be covered with particles, but, if desired, certain pre-selected areas may be left uncovered to provide special effects. Excess particles may be removed, for example by shaking, blowing, or turning the assembly upside down, leaving a layer of particles essentially one particle thick on the wet plastisol surface.

Heating the assembly to fusion temperature, as previously indicated, fuses the plastisol layer to a solid state with the lower portions of the resin granules firmly embedded in the upper surface of the plastisol layer. The final surface has a texture or grain which is a consequence of the size and shape of the particles sticking up like so many small lumps or piles from the surface to give a marked relief effect, visually and by touch. The degree of melting or flowing of the particles which takes place during the fusion step also has a bearing on the appearance of the product.

Fabric-like effects are obtained by application of fibers, for example in the form of textile flock (e.g., nylon, cotton, rayon, polyester, etc. or mixtures thereof) to the resin particles. This is suitably done prior to the fusion step. In order to obtain more thorough and even coverage of the surface with flock, the layer of resin particles is wet by application of a thin coating of plastisol. (This coating is too thin to obscure the particulate texture.) The flock is then sifted onto or otherwise suitably deposited on the resin particles. Subsequently, the described fusion step (heating) is undertaken with the result that in addition to the particles becoming adhered to the plastisol base, the textile flock becomes firmly adhered to the resin particles at points of contact. Portions of the fibers of the flock remain sticking out in random directions to give a pleasing fabric-like appearance and feel to the granulated or pebbled resin surface. (The flock does not obscure the particulate texture because the fibers of the flock simply follow the contours of the particle surfaces.) Flocks of more than one color or size may be employed to produce variegated effects. Interesting variations may be produced by applying the flock to preselected areas. The length of flock employed is purely one of choice. Constant length flock is desirable but random cut flock can be used with some sacrifice in the degree of duplication of the contours, or definition of the surface outlines, of the resin particles as reflected in the flocked surface. Random cut flock may include very small fibers of virtually dust-like appearance as well as longer fibers (up to for example .03 inch in length); constant length flock usually consists of the longer fibers.

If desired, blowing agents may be included in the plastisol and/or in the resin particles to produce sponge or cellular effects in the sheet material of the invention.

The following examples will serve to illustrate the practice of the invention in more detail.

EXAMPLE I (A) Preparation of the pre-fused resin particles

Polyvinyl chloride resin powder (100 parts by weight) as supplied by the manufacturer is milled with 58 parts of dicapryl phthalate as a plasticizer, 3 parts of barium-cadmium stearate stabilizer and 10 parts of blue pigment, at a temperature of 340° F. to fuse the resin into a coherent mass which is removed from the mill in the form of sheets about (e.g., .06 inch thick). After cooling to room temperature the pre-fused sheets are fed to a chopper which breaks the sheets up easily and rapidly, without resort to addition of Dry Ice to the chopper, into irregular particles having an average size ranging from 0.125 inch to 0.02 inch, preferably in the range of from 0.08 to 0.04 inch. These particles are harsh and abrasive because of their relatively low plasticizer content. The pre-fused particles are mixed at room temperature with an additional 60 parts of dicapryl phthalate plasticizer. The resulting "dry mix" is allowed to stand overnight at room temperature by which time the additional plasticizer has diffused into the surfaces of the pre-fused particles, rendering them soft and flexible.

(B) Preparation of the plastisol base film and application of resin particles

A plastisol having the following composition is prepared.

| Ingredients: | Parts by weight |
|---|---|
| Polyvinyl chloride resin | 100 |
| Dicapryl phthalate | 30 |
| Diisodecyl phthalate | 30 |
| Stabilizer (barium-cadmium oleate) | 3 |
| Thickener (aluminum stearate) | 10 |

This plastisol is thixotropic and has a viscosity of approximately 1,500,000 poises. The plastisol is diluted with 10 parts of volatile solvent (e.g., Stoddard solvent-petroleum hydrocarbon distillate boiling in the range 176 to 210° C.) to render it sprayable. Referring to the drawings, and particularly to FIG. 1 thereof, the surface of a contoured automobile mat mold 10 is sprayed with the plastisol to provide a base layer 11 of plastisol about 0.035 inch thick on the surface of the mold. The prefused resin particles are sifted onto the surface of the plastisol to form a layer 12 of resin particles thereon. The mold is then vibrated to assist distribution of the particles and to settle the particles to a limited extent in the wet plastisol layer for better anchoring. The particles do not sink completely into the thixotropic plastisol, but remain "floating" with their bases below the surface of the plastisol and their upper portions protruding upwardly from the surface of the plastisol.

(C) Fusion of the plastisol

The mold is placed in an oven and heated for 12 minutes at 360° F. to fully fuse the base layer. The lower portions of the particles become firmly anchored in the base layer. Partial melting of the particles takes place. This melting alters the shape of the particles somewhat but they still present a granular or rough knob-like texture. The molded product, preferably after the mold has been cooled somewhat, is stripped from the mold. It will be noted that the integrity and strength of the product derive from the fused vinyl plastisol layer, rather than from the applied particles.

EXAMPLE II

Part (A) of Example I is repeated except that instead of 60 parts of additional dicapryl phthalate plasticizer in the overnight soaking stage, 90 parts is used, to make a total of 148 parts of plasticizer in the particles. Part (B) is then completed as in Example I. As shown in FIG. 2, the resin granules 15 are applied to the base layer 16 of plastisol on the mold 17. Thereafter, an additional thin coating 18 of the vinyl plastisol, 0.002–0.003 inch thick, is sprayed on top of the layer 15 of resin particles. A layer 19 of fibrous nylon flock (average fiber length about .03 inch, 1.5–3.0 denier) is sprinkled on top of the thin plastisol coating 18. The mold 17 is then placed in an oven for fusion as in part (C) of Example I. The flock 19 becomes firmly anchored in the fused thin coating layer 18, giving a textile-like character to the surface of the mat. Since the flock fibers are of shorter length than the projecting portions of the resin particles, the flock does not obscure the granular surface structure imparted by the particles.

EXAMPLE III

Following the procedure of part (A) of Example I, 100 parts of polyvinyl chloride resin powder is milled with 80 parts of dicapryl phthalate, 3 parts of barium-cadmium stabilizer and 10 parts of blue pigment, at a temperature of 340° F. to fuse the resin into a sheet which is then ground into granules. Thereafter 70 parts of dicapryl phthalate is blended with the prefused granules (on the basis of 100 parts of resin) and allowed to soak into the granules.

A non-thixotropic plastisol having the following composition is prepared:

| Ingredients: | Parts by weight |
|---|---|
| Polyvinyl chloride | 100 |
| Dicapryl phthalate | 25 |
| Diisodecyl phthalate | 25 |
| Epoxidized soy bean oil | 10 |
| Dioctyl sebacate | 15 |
| Barium-cadmium oleate | 3 |

The plastisol is diluted with 10 parts of Stoddard solvent to render it sprayable. A contoured mold surface, such as an automobile mat mold surface 22 (FIG. 3) is heated to approximately 200–220° F. A series of layers of the plastisol is built up by successive spraying on the heated mold surface to a total build-up of approximately .03 inch, to provide a base layer 23. The heat in the mold causes the plastisol to gel on the surface of the mold, thereby preventing its slumping or running, even on the non-horizontal portions of the mold. The mold 22 and the vinyl layer 23 gelled thereon are cooled to a lower temperature (e.g. 110–120° F.) and a thin (e.g. .006–.008 inch thick) intermediate layer 24 is sprayed onto the surface of the gelled vinyl. Optionally this layer 24 may be developed from the thixotropic compound set forth in Example I, part (B). The resin granules 25 are applied to the wet vinyl surface 24 and the mold is placed in an oven and heated for 12 minutes at 360° F. to fully fuse the base and intermediate vinyl layers, which thereby in effect become a single integral base layer with the granules embedded in the surface thereof.

EXAMPLE IV

This example illustrates the applicability of the invention to continuous preparation of roll or flat goods.

Referring to FIG. 4, a base fabric 30 (e.g. a 65 by 45 one pick cotton twill weighing 7.1 ounces per square yard) is advanced continuously from a supply roll 31 onto an endless travelling supporting belt 32. The fabric passes under a doctor knife 33 which applies to the upper surface of the fabric a .035 inch thick layer 34 of non-thixotropic vinyl plastisol (formulation as in Example III). The coated fabric passes through a gelling oven 36 heated to a temperature of 360° F. where the time of dwell is sufficient to gel the vinyl layer (gelling temperature of approximately 200–220° F.). Thereafter the gelled coated fabric is passed under a second doctor knife 37 to apply a second, intermediate plastisol layer 39 (which may have the same composition as the first layer) approximately .006 inch thick. Fused granules 40, pre-soaked in plasticizer in the manner set forth in Example II, are then sprinkled onto the wet surface by means of a shaker 41. The granules sink into the thin intermediate layer 39 but do not penetrate the base layer 34 because the base layer is already gelled. The upper portions of the granules stick up above the thin intermediate layer. The composite is passed through an oven 43 heated to a temperature of 380–400° F. to fully fuse the base layer 34 and the intermediate layer 39. At this temperature a period of about 10 minutes is sufficient. After cooling, the product may be wound up into a roll 44.

As a substitute for the cotton twill fabric, there may be used paper, burlap, other woven fabrics, nonwoven fabrics, vinyl coated fabrics, etc.

EXAMPLE V

In the event that it is not desired to have a reinforcing layer incorporated in the flat sheet or roll goods, Example IV may be repeated using, as shown in FIG. 5, a release material 46 such as a release-coated paper in place of the twill fabric. The plastisol may be cast directly on the release paper 46, supported on a conveyer belt 47, to form the vinyl base layer 48, followed, after gelling, by the thin intermediate plastisol layer 49 and deposition of resin granules 50. Fusion is carried out as in Example V, after which the product is stripped from the release paper 46. In place of using a release paper, the conveyer belt 47 itself may be of release material, for example, a polytetrafluoroethylene belt may be used, or a stainless steel belt, and the plastisol cast directly thereon.

Having thus described my invention, what I claim and desire to protect by Letters Patent is:

1. A plastic sheet material comprising a base layer of fused polyvinyl chloride plastisol, and granules of pre-fused polyvinyl chloride resin on said base, the bases of said granules being firmly embedded in said base layer, and upper portions of said granules protruding above said base layer to give a granular relief effect to the surface of the sheet material, the upper surfaces of the granules being coated with a thin layer of fused plastisol on the surface of which fibrous flock is anchored with ends of the fibers embedded in said thin layer.

2. A sheet as in claim 1 in which the granules form a layer one granule thick.

3. A sheet as in claim 1 in the form of a contoured automobile mat.

4. A sheet as in claim 1 having a reinforcing backing on the underside of said base layer.

5. A sheet as in claim 4 in which said reinforcing backing is a textile fabric.

6. A method of making a plastic sheet material having a textured surface comprising in combination the steps of
    (a) providing granules of thermoplastic resin,
    (b) providing a plastisol,
    (c) applying said plastisol to a molding surface,
    (d) applying the resin granules to the surface of the plastisol,
    (e) heating the assembly to fuse the plastisol with the bottom portions of the resin granules firmly embedded therein, and
    (f) removing the thus-formed sheet material from the molding surface, and, subsequent to step (d) and prior to step (e), applying to the granules a coating of plastisol and applying fibrous flock to said coating, which flock becomes anchored in said plastisol coating during the fusion step (e) to provide a textile-like surface on the granules.

7. A method of making a plastic sheet material having a textured surface comprising in combination the steps of
    (a) providing granules of thermoplastic resin,
    (b) providing a plastisol,
    (c) applying said plastisol to a molding surface,
    (d) applying the resin granules to the surface of the plastisol,
    (e) heating the assembly to fuse the plastisol with the bottom portions of the resin granules firmly embedded therein, and
    (f) removing the thus-formed sheet material from the molding surface, the said resin granules being made by fusing powdered polyvinyl chloride resin into a continuous mass containing not more than 80 parts of plasticizer per 100 parts of resin, breaking the thus pre-fused mass into granules, mixing the granules with from 30 to 120 parts of additional plasticizer per 100 parts of resin, the said additional plasticizer being absorbed by the pre-fused granules, the said parts being by weight.

References Cited
UNITED STATES PATENTS

| | | | |
|---|---|---|---|
| 2,265,303 | 12/1941 | Moss | 260—34.2 |
| 2,385,920 | 10/1945 | Jenkins | 260—34.2 |
| 2,530,852 | 11/1950 | Bixby | 260—34.2 |
| 2,761,177 | 9/1956 | Walters | 161—162X |
| 3,194,856 | 7/1965 | Palmer | 161—162X |
| 3,366,503 | 1/1968 | Dillhoefer et al. | 117—17 |
| 3,385,722 | 5/1968 | Weaver et al. | 117—25X |
| 3,152,002 | 10/1964 | Wisotzky et al. | 161—62X |

WILLIAM J. VAN BALEN, Primary Examiner

M. A. LITMAN, Assistant Examiner

U.S. Cl. X.R.

117—25, 26, 21; 161—64, 67, 162